(12) United States Patent
Cabezas et al.

(10) Patent No.: US 6,662,320 B1
(45) Date of Patent: Dec. 9, 2003

(54) METHOD AND APPARATUS FOR INHIBITING AN ADAPTER BUS ERROR SIGNAL FOLLOWING A RESET OPERATION

(75) Inventors: Rafael Graniello Cabezas, Austin, TX (US); Robert George Kovacs, Austin, TX (US); Michael Anthony Perez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 09/620,724

(22) Filed: Jul. 20, 2000

(51) Int. Cl.$^7$ ............................................. H05K 10/00
(52) U.S. Cl. ........................ 714/56; 714/24; 710/302
(58) Field of Search ............................ 714/56, 44, 23, 714/24, 12; 710/300, 301, 302; 713/1, 2, 100

(56) References Cited

U.S. PATENT DOCUMENTS

| | | | | |
|---|---|---|---|---|
| 5,448,725 A | * | 9/1995 | Gervais ........................ 714/47 |
| 5,815,647 A | * | 9/1998 | Buckland et al. ............... 714/3 |
| 5,864,656 A | * | 1/1999 | Park ............................. 714/10 |
| 6,061,810 A | * | 5/2000 | Potter ........................... 714/23 |
| 6,247,144 B1 | * | 6/2001 | Macias-Garza et al. ........ 714/25 |
| 6,253,320 B1 | * | 6/2001 | Sekiguchi et al. ............. 713/2 |
| 6,370,657 B1 | * | 4/2002 | Jansen et al. .................. 714/23 |

* cited by examiner

Primary Examiner—Scott Baderman
Assistant Examiner—Joshua Lohn
(74) Attorney, Agent, or Firm—Duke W. Yee; Mark E. McBurney; Lisa L. B. Yociss

(57) ABSTRACT

A method and an apparatus is presented for preventing an adapter card that has been reset from issuing spurious error signals due to the fact it is not synchronized with the system at the time it comes out of reset. To prevent spurious errors, the data processing issues a command to the adapter card that is to be reset that disables error checking before the reset command is sent. The reset command is sent next. After the adapter card completes the reset operation, it notifies the system that the reset is completed. The adapter card waits until it receives a command from the system to re-enable error checking before it turns back on error checking. In this manner, the system can insure that error checking is only turned back on synchronously with other system activities so that spurious error signals are not generated.

42 Claims, 7 Drawing Sheets

100
Network

300
Client

METHOD AND APPARATUS FOR INHIBITING AN ADAPTER BUS ERROR SIGNAL FOLLOWING A RESET OPERATION

BACKGROUND OF THE INVENTION

1. Technical Field

The present invention relates generally to an improved handling of reset operations and, in particular, to a method and an apparatus for managing error signals. Still more particularly, the present invention provides a method and an apparatus for inhibiting the generation of spurious error signal following the reset of an adapter card or bridge circuit.

2. Description of the Related Art

In a typical computer system, interrupts are handled via a host bridge between the devices plugged into card slots on the system bus and the interrupt processing hardware and software. For example, in a PCI (Peripheral Component Interconnect) system commonly used for personal computers and workstations, there is a PCI Host Bridge (PHB).

The adapter chips or bridges in a system can be reset due to a variety of hardware or software conditions. For example, in many systems the devices are "hot plugable", which means devices can be added or removed from the system while other parts of the computer are fully functional. This leads to difficulties since the component coming out of reset is not synchronized with the rest of the system and may become active when another adapter is in the middle of a transaction.

Consider the case of parity error checking. Parity is based on a sequence of data and is only accurate if the entire sequence is processed. If an adapter comes out of reset when a data sequence from another adapter using the same system bus is partially completed, then the adapter coming out of reset will most likely detect a parity error since it has not seen the entire sequence of data. Most likely this will be a spurious error signal where no real error existed. This results in an error report that cannot be explained when the data is examined and appears to be "good." Therefore, it would be advantageous to have a method and an apparatus that prevents an adapter that has been reset from issuing spurious error signals due to the fact it was not synchronized with the system at the time it came out of reset.

SUMMARY OF THE INVENTION

A method and an apparatus is presented for preventing an adapter card that has been reset from issuing spurious error signals due to the fact it is not synchronized with the system at the time it comes out of reset. For example, if an adapter card comes out of reset when another adapter card on the same system bus is sending a parity sensitive data stream, then the adapter coming out of reset will most likely detect a parity error since it has not seen the entire sequence of data. This is a spurious error signal where no real error exists.

To prevent spurious errors, the data processing issues a command to the adapter card that is to be reset that disables error checking before the reset command is sent. The reset command is sent next. After the adapter card completes the reset operation, it notifies the system that the reset is completed. The adapter card waits until it receives a command from the system to re-enable error checking before it turns back on error checking. In this manner, the system can insure that error checking is only turned back on synchronously with other system activities so that spurious error signals are not generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
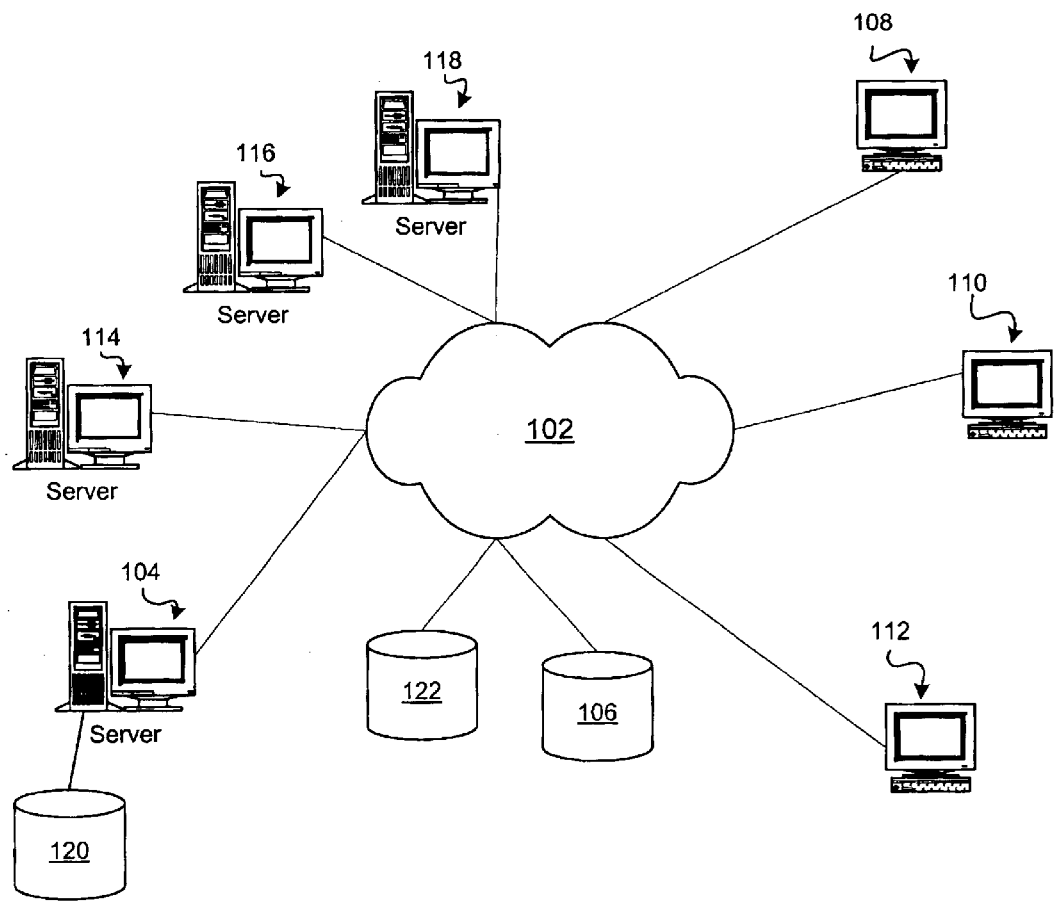
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

Although not evident in this diagram due to limitations in drawing space, there are typically many client machines for each server machine. It is critically important that each server machine, which must handle requests from many clients, be configured to respond to client requests as rapidly as possible. In particular, a server machine may contain many four port Ethernet cards all competing for interrupt lines through the host bridge. Effective management of these interrupts is critical for improved performance in these server machines.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention. The present invention may be implemented with on a server machine, such as server 104, or a client machine, such as client 108.

Figure 2:
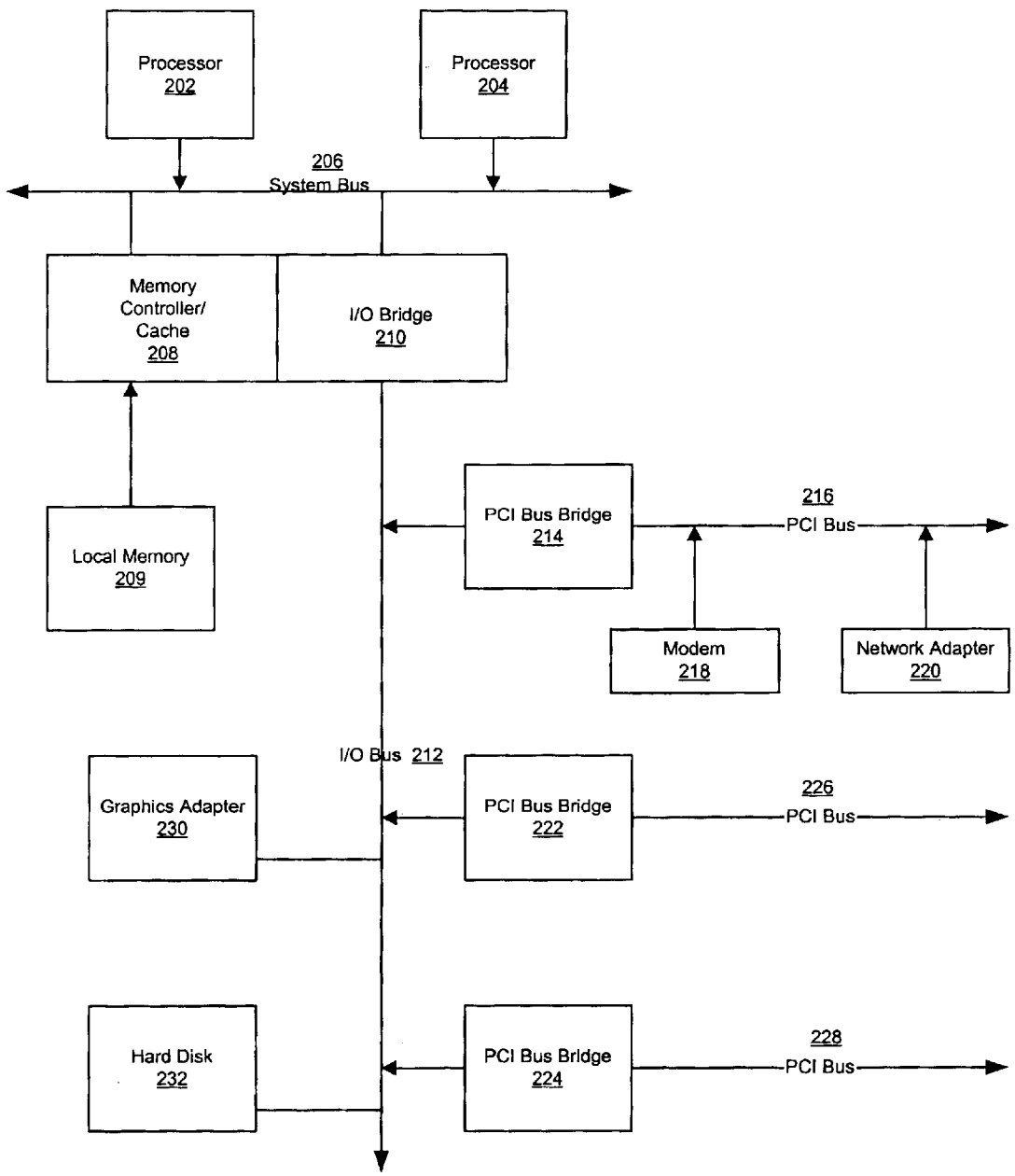
FIG. 2 is a block diagram of a data processing system that may be implemented as a server in which the present invention may be implemented.

Referring to FIG. 2, a block diagram of a data processing system which may be implemented as a server, such as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

A typical server machine used in this invention will have several multiport Ethernet cards connected to each PCI bus bridge 214, 222 and 224. Often there are fewer interrupt lines available through each bus bridge than is required by all the Ethernet ports available. Ethernet ports can share interrupts but this will reduce overall system performance. It is important that interrupts be configured in a manner to maximize system performance. Since system demands also change with time, it is equally important to be able to change the configuration of these interrupts dynamically depending on system requirements.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, New York, running the Advanced Interactive Executive (AIX) operating system. The present invention deals with adapter cards connected to a system bus, such as cards connected to PCI bus 216, or bus host adapters, such as adapter 222.

Figure 3:
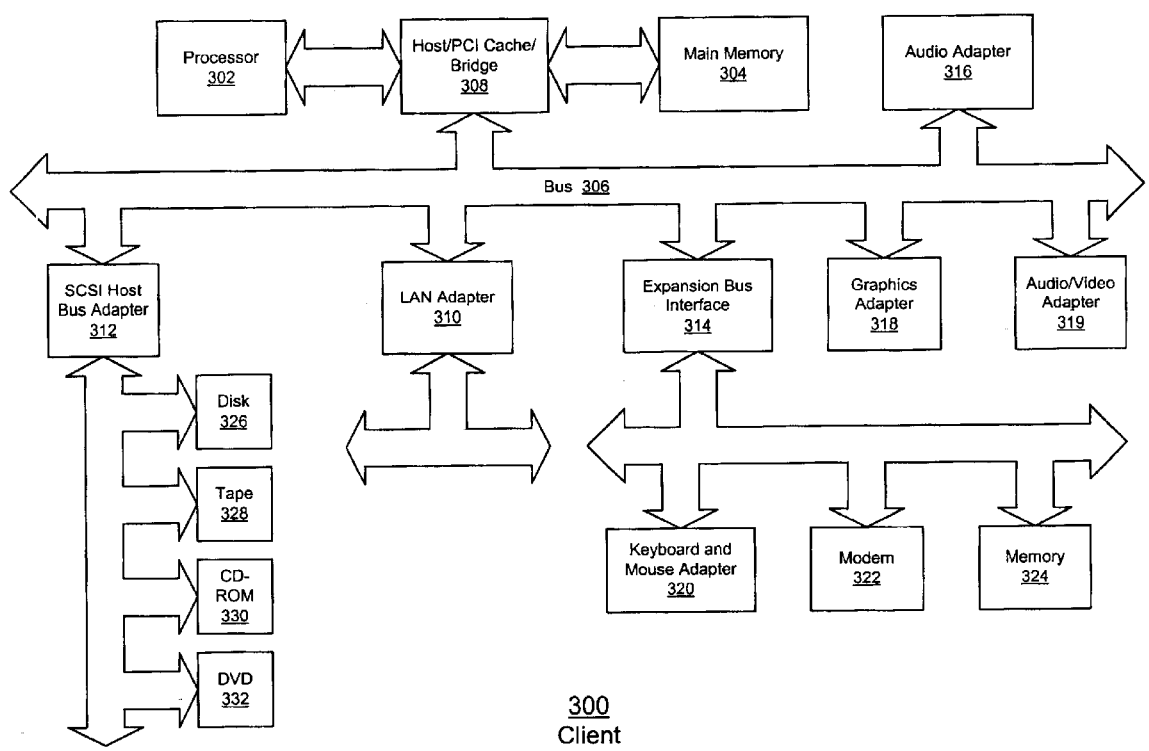
FIG. 3 is a block diagram of a data processing system that may be implemented as a client in a client-server network.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. Although the discussion of this invention concentrates on improving server performance, this invention can be used in any computer system where multiple peripheral devices are connected via one or more host bridges to the computer system.

Figure 4:
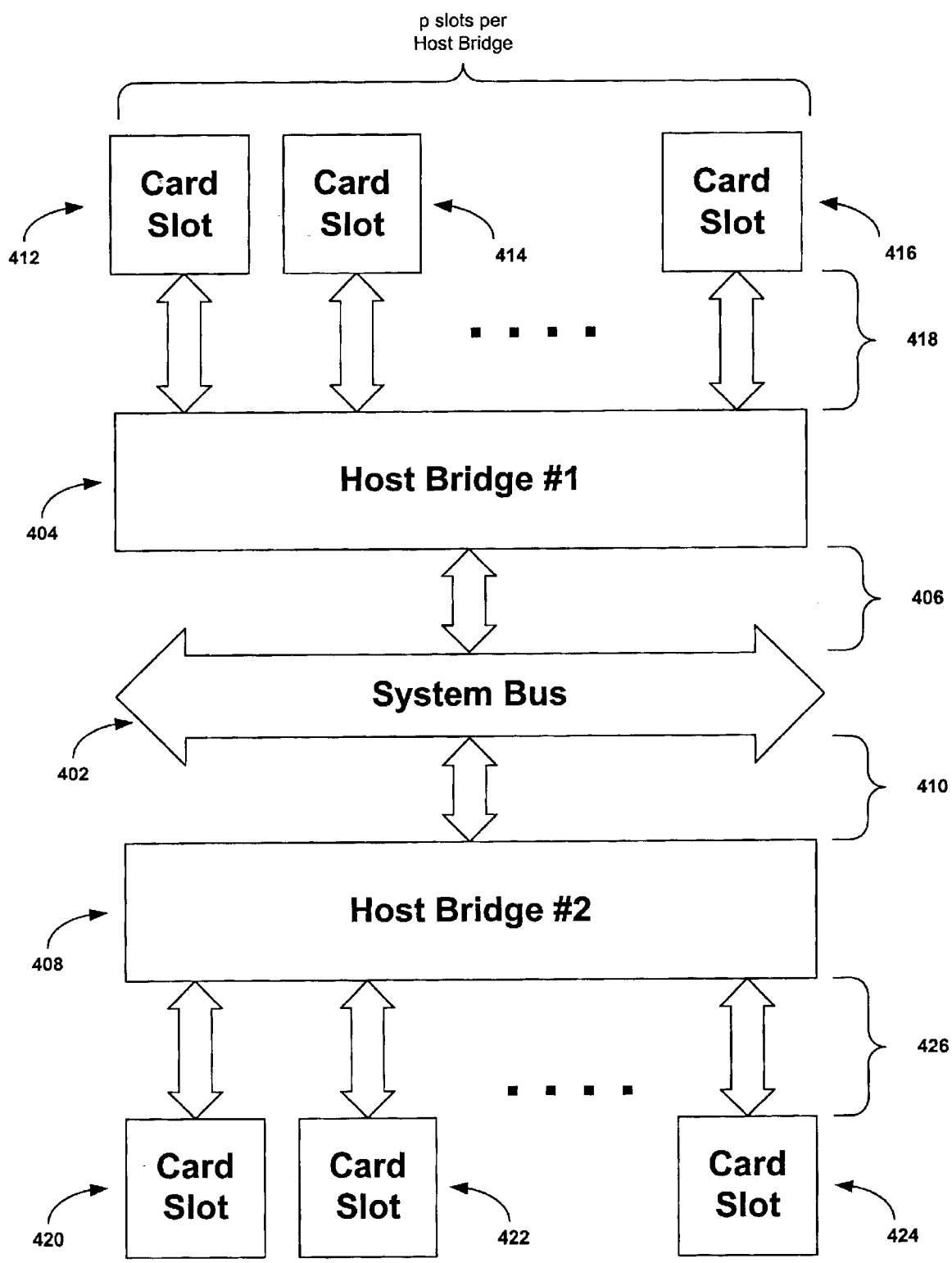
FIG. 4 is a block diagram of host bridge as used in the present invention.

Referring to FIG. 4, a block diagram shows a system bus and two host bridge adapters according to the present invention. System bus 402 interfaces with Host Bridge #1 404 via connection 406. In a similar manner, Host Bridge #2 408 interfaces with system bus 402 via connection 410. It is assumed each Host Bridge can handle a maximum of "p" card slots. Card slots 412, 414, and 416 are shown connected to Host Bridge #1 404 via connections 416. Card slots 420, 422, and 424 are shown connected to Host Bridge #2 408 via connections 426. Although only three card slots are shown in each case due to limitations in drawing size, the value of "p" for a typical server is larger than this.

This invention involves correct operation of the computer system when multiple host bridges are connected to the same system bus. A host bridge may be reset due to a variety of hardware or software conditions. "Hot plugging" of devices into a card slot is one example of a condition that will cause a host bridge to reset. This may lead to difficulties since a host bridge coming out of reset may not be synchronized with the rest of the system and may become active when another host adapter is in the middle of a transaction. For example, the reset host adapter may only see a partial data stream on the bus and generate a spurious parity error signal where no real parity error exists. This results in an error report that cannot be explained when the complete set of data is examined. The key to this invention is to insure that error checking does not occur until the host bridge coming out of reset is fully recovered and in sync with the rest of the system.

Figure 5A:
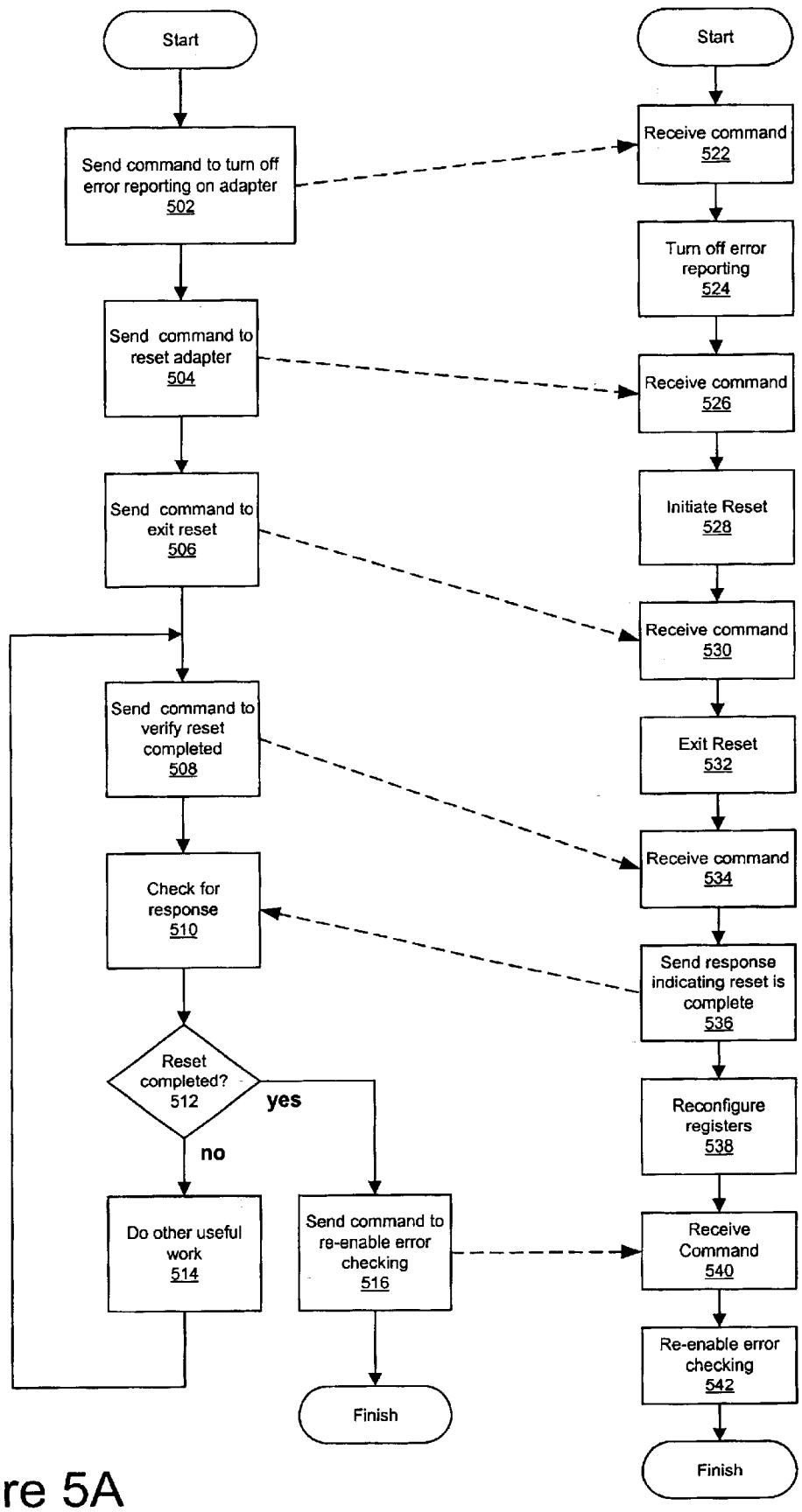
FIG. 5A is a flowchart showing the interaction between the system and the adapter using polling during the reset operation.

Referring now to FIG. 5A, a flowchart shows the interaction between the system and the adapter using polling during the reset operation. The actions on the left, steps 502 through 516, occur at the system. The actions on the right, steps 522 through 542, occur at the adapter. The interconnecting arrows indicate the communications of commands or information between the system and the adapter. These commands will come from the processor, to the I/O controller, to the PCI Host Bridge, and possible through another bridge (e.g., a PCI-PCI bridge, if present) to finally reach the adapter.

Reading and writing to registers refer to registers in the I/O adapter. A particular device configuration will determine which registers need to be polled to see if the adapter is fully recovered from a reset. Typically, registers on adapters are handled by memory mapped I/O. From the perspective of the processor, the "register" is simply a memory address. A subrange of memory addresses are reserved for input/output to the adapter card. When the processor uses an address in the specified subrange, the I/O controller will decode the address instead of the memory controller, since the I/O controller is programmed to decode addresses in that range. The I/O controller then forwards the command, based on its settings, to the correct host adapter and adapter card slot. The I/O adapter is programmed to respond to a subrange of addresses during the boot process handled by the firmware.

The reset process is first described from the perspective of the system using the left side of FIG. 5. The system sends a command to turn off error reporting in the host adapter (step 502). It then issues a command to reset the adapter (step 504). This is followed by a command to exit the reset operation (step 506).

The system then sends a command to verify that the reset is completed (step 508). The system then checks for a response that the reset is completed (step 510). If the response has not been received yet (step 512: no), the system does some other useful work (step 514) before repeating the verification of completion command (step 508). Other useful work can be any task waiting for access to the CPU. When it is detected that the reset is completed (step 512: yes), the system issues a command to re-enable error checking (step 516) that was disabled earlier (step 502).

The reset operation from the perspective of the adapter card is shown on the right of FIG. 5. The adapter receives a command through a register and then carries out the command. After the first command is received (step 522), the error reporting mechanism is turned off (step 524). The next command received (step 526) causes the adapter to initiate a reset (step 528). This is followed by receiving a command (step 530) to exit the reset (step 532).

The next command received (step 534) asks for verification that the reset has been completed. The adapter sends a response indicating the reset is, in fact, completed (step 536). As noted previously, this response might be in the form of setting a register value if a polling mechanism is used, as shown in FIG. 5, or it may be an interrupt indicating reset completion.

The adapter card then reconfigures its registers (step 538), as appropriate for the device. It then waits to synchronize with the system before turning on error checking. This is accomplish by waiting to receive a command to re-enable error checking (step 540). Once that command is received, the adapter can safely re-enable error checking without causing any spurious error signals (step 542).

Figure 5B:
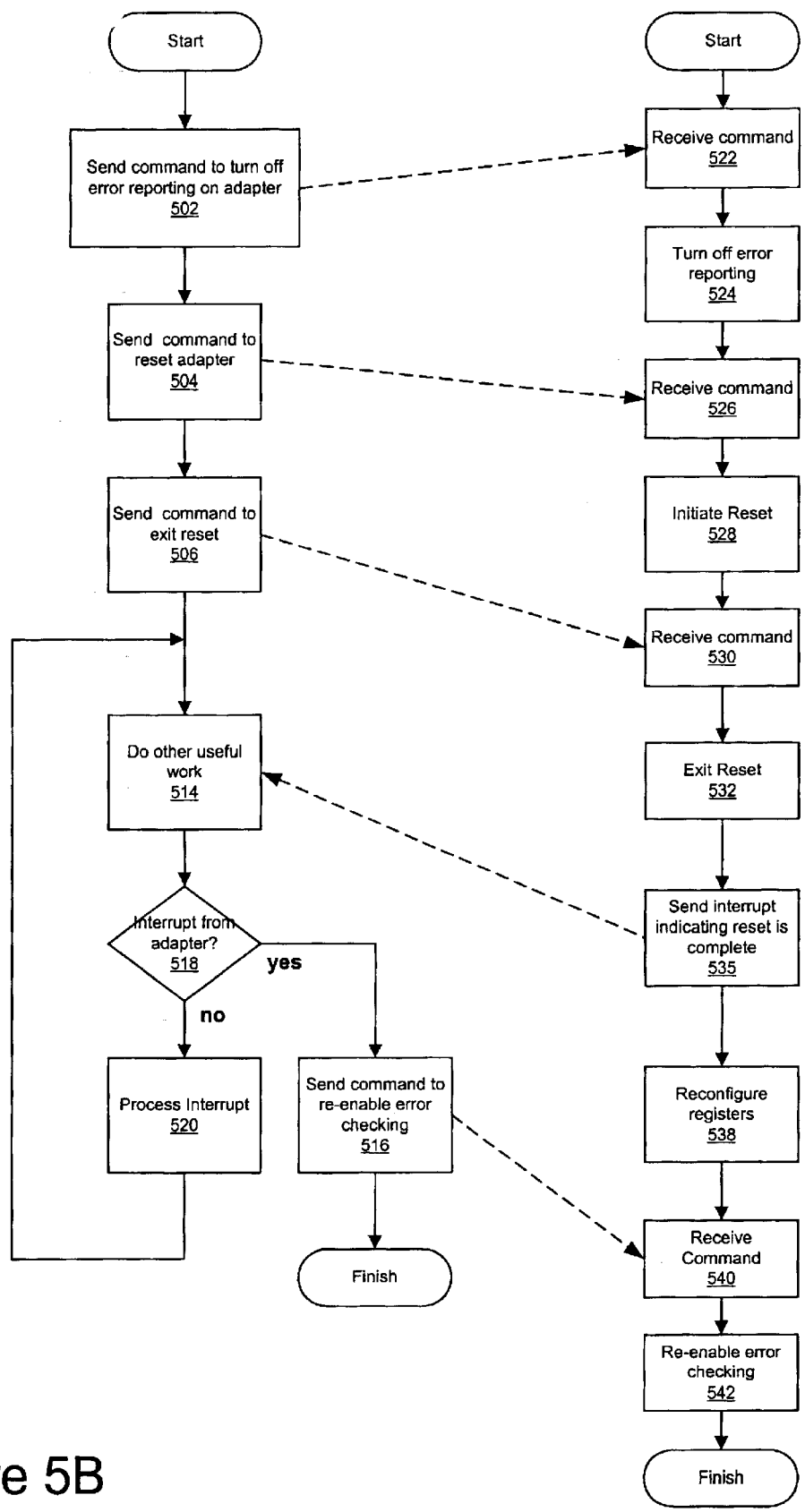
FIG. 5B is a flowchart showing the interaction between the system and the adapter using an interrupt during the reset operation.
Figure 5C:
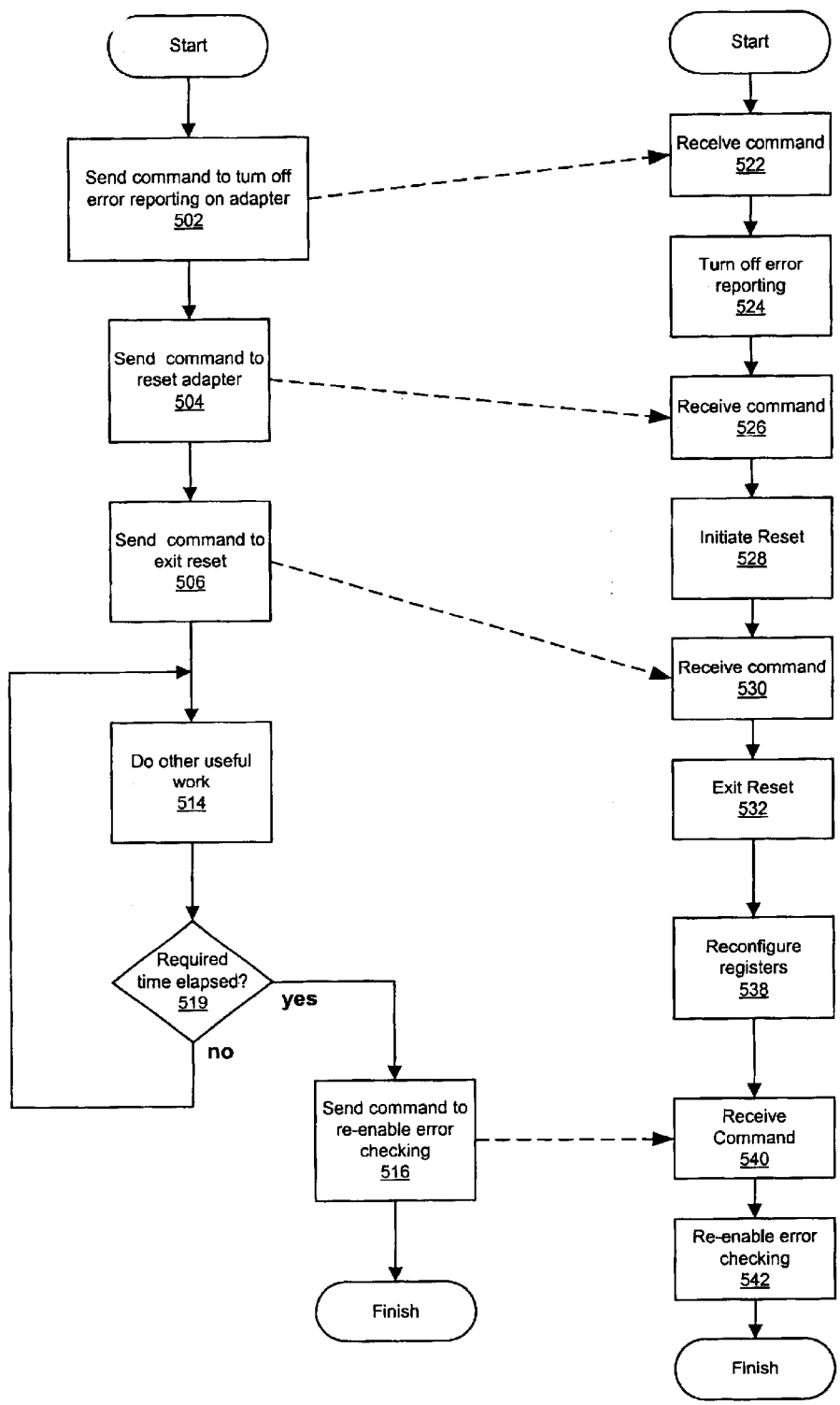
FIG. 5C is a flowchart showing the interaction between the system and the adapter using a timeout during the reset operation.

The operation comprising steps 508–514 in FIG. 5A is commonly referred to as polling. As one of ordinary skill in the art will appreciate, an interrupt mechanism could also be used to accomplish this operation. This is illustrated in FIG. 5B. In this flowchart, after sending the command to exit reset (step 506), the system proceeds to do other useful work (step 514) based on tasks waiting to access the CPU. This "work" is interrupted when an interrupt signal is received. If the interrupt is from the adapter card to indicate completion of the reset (step 518: yes), then, at a time that will not cause spurious errors, the system sends the command to re-enable error checking (step 516). If the interrupt is from some device other than the adapter card (step 518: no), then the appropriate interrupt handler is called (step 520) before the system returns to the interrupted task (step 514).

The interrupt process from the perspective of the adapter card is very similar to the polling process. However, rather than receiving the verification command and responding (steps 534 and 536 in FIG. 5A), the adapter simply sends an interrupt (step 535 in FIG. 5B) to indicate the reset process is complete.

Some adapter cards may be able to guarantee the reset is completed within a specified period of time. If this is the case, then a third type of processing is possible, as show in FIG. 5C. After sending the exit reset command (step 506), the system starts a timer that waits for the required period of time for the reset to be completed. During this period the system performs other work (step 514) based on requests for CPU time. If the required time has not expired yet (step 519: no), then the system continues doing other work (step 514). After the required time has expired, the system sends the command to re-enable error checking (step 516).

From the perspective of the adapter card, the steps of receiving the command to verify the reset is complete (step 534 in Figure SA) and sending a response to indicate the reset is complete (step 536 in FIG. 5A) are eliminated. The adapter proceeds from exiting the reset (step 532) to reconfiguring the registers (step 538) to waiting for the command to re-enable error checking (step 540).

Regardless of the approach used (polling, interrupts, or timeout), the key idea of this invention is that the system sends commands to the adapter to disable error checking (step 502) and does not send a command to re-enable error checking (step 516) until error checking can be turned back on without generating spurious error signals.

The description of the present invention has been presented for purposes of illustration and description but is not intended to be exhaustive or limited to the invention in the form disclosed. Many modifications and variations will be apparent to those of ordinary skill in the art. The embodiment described involves the reset operation between a system and an adapter card. The same approach can be applied to two PCI bridges and between other I/O bridges. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a data processing system to prevent spurious error signals during reset of a device, the method comprising the steps of:
   sending a first command to disable error checking on the device;
   sending a second command to initiate a reset of the device;
   verifying that the reset is complete;
   sending a third command to re-enable error checking on the device; and
   wherein completion of reset of the device is verified by waiting a specified time period, wherein the time period is dependent on the characteristics of the device being reset.

2. The method of claim 1, wherein other components in the system are fully functional during the reset of the device.

3. The method of claim 1, wherein commands are set to registers associated with the device via memory mapped I/O.

4. The method of claim 1, wherein if the device does not automatically exit from the reset operation, then a fourth command to exit the reset operation is sent, wherein the fourth command is sent after the second command is sent.

5. The method of claim 1, wherein completion of reset of the device is verified by polling the device.

6. The method of claim 1, wherein completion of reset of the device is verified by an interrupt handling routine.

7. The method of claim 1, wherein the command to re-enable error checking is sent at a time synchronous with other system activities.

8. A method in an adapter card connected to a data processing system to prevent generation of spurious error signals after a reset operation, the method comprising the steps of:
   receiving a first command to disable error checking and carrying out the first command;
   receiving a second command to initiate a reset operation and carrying out the second command;
   sending a verification to the data processing system that the reset operation is complete;
   receiving a third command to re-enable error checking and carrying out the third command; and
   wherein other components in the data processing system are fully functional during the reset of the adapter card.

9. The method of claim 8, wherein commands arc received in registers associated with the adapter card via memory mapped I/O in the data processing system.

10. The method of claim 8, wherein if the adapter card does not automatically exit from the reset operation, then a fourth command to exit the reset operation is received and carried out after the second command is received.

11. The method of claim 8, wherein completion of reset of the adapter card is verified by responding to polling from the data processing system.

12. The method of claim 8, wherein completion of reset of the adapter card is verified by sending an interrupt signal to the data processing system.

13. The method of claimed 8, wherein completion of reset of the adapter card is verified by guaranteeing the reset will be completed at the end of a time delay known by the data processing system.

14. The method of claim 8, wherein the command to re-enable error checking is received from the data processing system at a time when it is safe to re-enable error checking without generation of spurious error signals.

15. An apparatus in a data processing system to prevent spurious error signals during reset of a device, the apparatus comprising:
   a sending means for sending a first command to disable error checking on the device;
   the sending means for sending a second command to initiate a reset of the device;
   a verifying means for verifying that the reset is complete;
   the sending means for sending a third command to re-enable error checking on the device;
   wherein the verification means for verifying the completion of reset of the device is by waiting a specified time period, wherein the time period is dependent on the characteristics of the device being reset.

16. The apparatus of claim 15, wherein other components in the system are fully functional during the reset of the device.

17. The apparatus of claim 15, wherein the sending means sets values for registers associated with the device via memory mapped I/O.

18. The apparatus of claim 15, wherein if the device does not automatically exit from the reset operation, then the sending means sends a fourth command to exit the reset operation, wherein the fourth command is sent after the second command is sent.

19. The apparatus of claim 15, wherein the verification means for verifying the completion of reset of the device is polling the device.

20. The apparatus of claim 15, wherein the verification means for verifying the completion of reset of the device is by an interrupt handling routine.

21. The apparatus of claim 15, wherein the sending means sends the command to re-enable error checking at a time synchronous with other system activities.

22. An apparatus in an adapter card connected to a data processing system to prevent generation of spurious error signals after a reset operation, the apparatus comprising:
   a receiving means for receiving a first command to disable error checking and carrying out the first command;

the receiving means for receiving a second command to initiate a reset operation and carrying out the second command;

a notifying means for sending a verification to the data processing system that the reset operation is complete;

the receiving means for receiving a third command to re-enable error checking and carrying out the third command;

wherein other components in the data processing system are fully functional during the reset of the adapter card.

23. The apparatus of claim 22, wherein the receiving means for commands is based on registers associated with the adapter card, wherein adapter card registers are handled via memory mapped I/O in the data processing system.

24. The apparatus of claim 22, wherein if the adapter card does not automatically exit from the reset operation, then the receiving means receives a fourth command to exit the reset operation and executes the fourth command after the second command is received.

25. The apparatus of claim 22, wherein the notification of completion of reset of the adapter card is by responding to polling from the data processing system.

26. The apparatus of claim 22, wherein the notification of completion of reset of the adapter card is by sending an interrupt signal to the data processing system.

27. The apparatus of claim 22, wherein the notification of completion of reset of the adapter card is verified by guaranteeing the reset will be completed at the end of a time delay known by the data processing system.

28. The apparatus of claim 22, wherein the receiving means receives a command to re-enable error checking from the data processing system at a time when it is safe to re-enable error checking without generation of spurious error signals.

29. A computer program product in a data processing system to prevent spurious error signals during reset of a device, the computer program product comprising:

instructions for sending a first command to disable error checking on the device;

instructions for sending a second command to initiate a reset of the device;

instructions for verifying that the reset is complete;

instructions for sending a third command to re-enable error checking on the device; and wherein the instructions for verifying the completion of reset of the device wait a specified time period, wherein the time period is dependent on the characteristics of the device being reset.

30. The computer program product of claim 29, wherein other components in the system are fully functional during the reset of the device.

31. The computer program product of claim 29, wherein the instructions for sending set values for registers associated with the device via memory mapped I/O.

32. The computer program product of claim 29, wherein if the device does not automatically exit from the reset operation, then instructions for sending a fourth command to exit the reset operation are executed after the second command is sent.

33. The computer program product of claim 29, wherein the instructions for verifying the completion of reset of the device use polling of the device.

34. The computer program product of claim 29, wherein the instructions for verifying the completion of reset of the device use an interrupt handling routine.

35. The computer program product of claim 29, wherein the instructions for sending the command to re-enable error checking are executed at a time synchronous with other system activities.

36. A computer program product in an adapter card connected to a data processing system to prevent generation of spurious error signals after a reset operation, the computer program product comprising:

instructions for receiving a first command to disable error checking and carrying out the first command;

instructions for receiving a second command to initiate a reset operation and carrying out the second command;

instructions for sending a verification to the data processing system that the reset operation is complete;

instructions for receiving a third command to re-enable error checking and carrying out the third command; and wherein other components in the data processing system are fully functional during the reset of the adapter card.

37. The computer program product of claim 36, wherein the instructions for receiving commands are based on registers associated with the adapter card, wherein adapter card registers are handled via memory mapped I/O in the data processing system.

38. The computer program product of claim 36, wherein if the adapter card does not automatically exit from the reset operation, then instructions receive a fourth command to exit the reset operation and carry out the fourth command after the second command is received.

39. The computer program product of claim 36, wherein the instructions for notification of completion of reset of the adapter card respond to polling from the data processing system.

40. The computer program product of claim 36, wherein the instructions for notification of completion of reset of the adapter card send an interrupt signal to the data processing system.

41. The computer program product of claim 36, wherein the instructions for notification of completion of reset of the adapter card guarantee the reset will be completed at the end of a time delay known by the data processing system.

42. The computer program product of claim 36, wherein the instructions for receiving a command to re-enable error checking from the data processing system occur at a time when it is safe to re-enable error checking without generation of spurious error signals.

* * * * *

UNITED STATES PATENT AND TRADEMARK OFFICE
CERTIFICATE OF CORRECTION

PATENT NO.     : 6,662,320 B1
DATED          : December 9, 2003
INVENTOR(S)    : Cabezas et al.

It is certified that error appears in the above-identified patent and that said Letters Patent is hereby corrected as shown below:

Column 8,
Line 7, after "commands" delete "arc" and insert -- are --.
Line 37, after "device;" insert -- and --.

Column 9,
Line 8, after "command;" insert -- and --.

Column 10,
Line 9, after "handling" delete "routinc" and insert -- routine --.

Signed and Sealed this

Seventeenth Day of January, 2006

JON W. DUDAS
*Director of the United States Patent and Trademark Office*